United States Patent Office 3,090,760
Patented May 21, 1963

3,090,760
LOW TEMPERATURE REGENERATION OF LEAD-CONTAMINATED CATALYSTS
George R. Lester, Des Plaines, Ill., assignor to Universal Oil Products Company, Des Plaines, Ill., a corporation of Delaware
No Drawing. Filed Apr. 8, 1960, Ser. No. 20,804
7 Claims. (Cl. 252—415)

The present invention relates to the regeneration or reactivation of catalytic composites which have become contaminated with lead as a consequence of having been exposed to contact with lead-containing waste products incident to the catalytic conversion of such waste products. In particular, the present invention concerns the removal of lead from spent catalysts employed in the conversion of the exhaust gases emanating from an internal combustion engine using leaded fuel.

It is now recognized that the elimination of certain components present in automotive exhaust gases is highly desirable and of prime importance in protecting the public health and welfare. The unavoidably incomplete combustion of hydrocarbon fuels by the gasoline or diesel engine results in the generation of substantial quantities of unburned hydrocarbons and other undesirable materials which, as waste products, are released to the atmosphere through the exhaust line. With the ever-increasing concentration of automobiles, particularly in urban areas, the discharge of such waste products into the atmosphere may reach significantly deleterious proportions. These combustion products are believed to react with atmospheric oxygen, under the influence of sunlight, to produce what is now commonly referred to as smog. Such combustion products include, by way of example, unsaturated hydrocarbons, partially oxidized hydrocarbons such as alcohols, ketones, aldehydes and acids, etc., carbon monoxide, and various oxides of nitrogen and sulfur. Although at least a portion of these compounds may be partially removed by chemical sorption media, the conversion of exhaust gas constituents by catalytic means is by far the preferred technique. The desired object is to achieve substantially complete conversion of all of the unburned hydrocarbons, particularly the high molecular weight unsaturated hydrocarbons, and carbon monoxide, as well as the partially-oxidized hydrocarbons hereinabove set forth, into carbon dioxide and water prior to discharging the exhaust gases into the atmosphere. Gasoline-powered internal combustion engines are a major but not the only source of atmospheric pollution; others include diesel engines, butane engines, natural gas engines, fired heaters and furnaces, refinery stacks, and the like.

Catalytic means for improving waste products for discharge into the atmosphere, and particularly for the conversion of the hydrocarbonaceous combustion products which are present in the exhaust gases emanating from an internal combustion engine, necessitates the use of a catalyst possessing an exceptionally high degree of activity, and particularly stability or capability of performing its intended function for an extended period of time. A wide variety of factors affect the stability of active catalytic composites, which factors are generally peculiar to environment in which the catalyst is employed. In regard to catalysts for the conversion of hydrocarbonaceous combustion products emanating from an internal combustion engine, the actual operation of the engine must be considered. For example, such engine is commonly operated over a wide range of speed and load conditions and, therefore, the combustion efficiency thereof correspondingly varies; the space velocity and temperature of the exhaust gases, as well as the concentration of combustible material therein, likewise varies over wide limits. The catalyst should be capable of withstanding high temperatures of the order of 1600° F. to as high as 2000° F. without rapid thermal deactivation, and preferably should possess maximum activity at substantially lower temperatures. The catalyst should have a relatively low threshold-activation temperature in order that the conversion reactions be self-initiating within a minimum time following startup from relatively cold conditions. In general, it is desirable that the catalyst be satisfactorily active at temperatures within the range of about 200° F. to about 2000° F.

The catalyst is usually disposed as a confined particle-form bed disposed in a suitable container or catalytic convertor which is installed in the engine exhaust line. The catalytic convertor may be of the through-flow, cross-flow, or radial-flow design and, in the case of vehicular applications, may supplant or be combined with the usual acoustic muffler. In the majority of systems, secondary or combustion air is injected upstream of the catalytic conversion zone, usually by means of an aspirator or by external compressor means.

Although a great many potentially good, high activity catalysts have been developed which perform well even under the aforesaid adverse conditions, such catalysts are nevertheless deleteriously affected by lead and lead compounds which are present as vapors or as entrained solids in the exhaust gases resulting from the combustion of a leaded fuel. The majority of motor fuels, including some diesel fuels and fuels for marine engines, contain tetraethyl lead or equivalent lead compounds as an additive for increasing the anti-knock efficiency of the engine in which the fuel is consumed. A typical commercial tetraethyl lead additive contains, in addition, approximately 2 gram-atoms of chlorine and 1 gram-atom of bromine, usually as ethylene dihalide, per gram-atom of lead, which is thus 1.5 times the stoichiometric quantity of halogen required to form the lead dihalide; in conventional terminology, the tetraethyl lead additive is said to contain 1.5 "theories" of halogen. The halogen serves as a scavenging agent to prevent build-up of lead deposits on spark plugs and engine cylinder walls by preferentially converting the lead tetraethyl, under the elevated cylinder temperatures prevailing combustion, to highly volatile lead halides, for example, to lead chloride and lead bromide or to the oxyhalides of lead; minor quantities of lead do not react with halogen and are converted instead to less volatile lead oxides. The major proportions of these lead compounds is discharged, as vapors or fines, into the exhaust line along with the exhaust gases. When the resulting lead-contaminated exhaust gases pass into contact with the exhaust gas conversion catalyst, the activity of the catalyst is substantially impaired, which phenomenon is demonstrated by the fact that the catalyst deactivation rate is very much greater than when unleaded fuel is employed.

On its face, this result would appear quite anomalous since most of the lead enters the conversion zone as a halide, and the normal catalyst bed temperature is in the range of 500° F. to 1600° F. whereby such halide is readily volatilized, whence one would expect the lead halide to pass freely through the bed with as much facility as it escaped deposition upon the engine cylinder walls and exhaust manifold structure. Such, however, is not the case. Although various theories have been proposed to explain the deactivation of catalysts by lead, it appears that the principal mechanism by which catalyst poisoning or deactivation occurs is one of chemical reaction between the volatile lead compounds and the catalyst base whereby to yield a stable, relatively non-volatile lead compound-catalyst base complex which plugs the pores of the catalyst and/or forms a mono-molecular film of complex over the entire micro-structure of the catalyst; evidence favors the latter theory because, in most instances, physical measurements of spent lead-contaminated catalyst reveal no appreciable reduction in surface area or pore volume as against those of the fresh catalyst. By catalyst base is meant a refractory inorganic oxide carrier or support, preferably of medium to high surface area, with which one or more catalytically active metals are composited. Typical bases include, for example, alumina, silica, titania, alumina-silica, alumina-zirconia, alumina-silica-zirconia, and the like. The deactivation of the catalyst is believed to proceed via the following reactions which are exemplary but not exhaustive of the several interactions of lead compounds with catalyst bases:

(1) $MeOH + PbX_2 \rightleftharpoons MeOPbX + HX$ (2) $MeOH + MeOPbX \rightleftharpoons MeOPbOMe + HX$ (3) $MeOPbX + H_2O \rightleftharpoons MeOPbOH + HX$ (4) $MeO + PbX_2 + H_2O \rightleftharpoons MeO_2Pb + 2HX$ where Me is a metallic component of the catalyst, e.g. Al, Zr, Ti, etc. and X is a halogen, for example, chlorine, bromine or iodine. In the event that lead enters the convertor as the tetravalent species, for example as $PbCl_4$, the conditions there are extremely conducive to reduction to the divalent compounds. Water, in the vapor or superheated vapor state, enters into reaction (3) and (4), supra, which water is inevitably present in hydrocarbon combustion products. By the time that the catalyst has accumulated an average lead content within the range of 5% to 50% by weight, and, more commonly, 10% to 25% by weight, which may occur after anywhere from 1,000 to 20,000 road miles of operation, depending upon the presence or absence of catalyst guard media, average space velocity, concentration of lead in the motor fuel, physical and/or chemical properties of the catalyst, and various other factors, the hydrocarbon and carbon monoxide conversion activities of the catalyst have usually fallen to such a low value as to preclude its continued use, and such lead-contaminated catalyst must therefore be replaced with fresh catalyst or regenerated in situ.

The present invention is concerned with a method of regenerating or reactivating a lead-contaminated catalyst, and particularly with a low-temperature regeneration thereof which is accomplished by subjecting the spent catalyst to contact with a mixture comprising hydrogen chloride and free chlorine. This treatment converts the lead-catalyst base complexes into lead tetrachloride, which is liquid at ambient temperatures and atmospheric pressure, and is thus readily volatilized and driven free from the catalytic mass; the removal of lead effected thereby is nearly quantitative. The present invention is to be distinguished from conventional regeneration techniques involving the treatment of leaded catalysts with aqueous mineral acid solutions or lead-dissolving reagents and possesses numerous distinct advantages thereover including a simple, single-step treatment, and eliminating the need for washing and drying the catalyst. The instant method is also to be distinguished from treatment with a hydrogen halide alone, which merely converts the lead to the lead dihalide and requires elevated temperatures of at least 500° F. and preferably above about 700° F. in order to volatilize lead dihalide. Regeneration by formation of lead tetrachloride, on the other hand, may be accomplished at ambient temperatures and therefore does not require any type of heating equipment as a part of the regeneration apparatus; furthermore, a much more rapid and complete removal of lead is achieved by the instant method.

In one embodiment, the present invention provides a method of regenerating a lead-contaminated catalyst which comprises subjecting said catalyst, at a temperature below about 221° F., and preferably at a temperature within the range of about 5° F. to about 220° F., to contact with an anhydrous mixture comprising hydrogen chloride and free chlorine.

Another embodiment of the instant invention relates to a method of regenerating a lead-contaminated catalyst which comprises subjecting said catalyst, at a temperature within the range of about 5° F. to about 220° F., to contact with an anhydrous gaseous mixture comprising hydrogen chloride, free chlorine and an inert diluent.

Still another embodiment of the present invention is directed to a method of regenerating a spent, lead-contaminated catalytic composite previously employed in the catalytic conversion of lead-containing waste products, and presently containing from about 5% to about 50% by weight of lead, which comprises passing a stream of an anhydrous gaseous mixture of hydrogen chloride, free chlorine and an inert diluent into contact with said catalytic composite at a temperature of from about 5° F. to about 220° F. and thereby converting at least a portion of said lead into lead tetrachloride, volatilizing the lead tetrachloride and sweeping it free of said composite.

The method of the present invention and the benefits afforded through the utilization thereof will be more clearly understood by defining several of the terms employed within the specification and appended claims. The term "catalyst" is intended to connote an element, compound, composite of two or more elements or compounds, or mechanical mixture of elements, compounds or composites which are employed for their catalytic activity in regard to the conversion of various waste products, particularly hydrocarbons and/or carbon monoxide. The terms "lead" and "lead-contaminated" refer to metallic lead, lead compounds, particularly lead salts such as the sulfates and halides thereof, lead oxides, lead oxyhalides, mixtures of two or more such lead compounds, lead or lead salt-catalyst complexes etc., since the actual form or forms in which the lead exists in relation to the catalyst are not definitely known and, in any event, are immaterial to the operability of the present method. The term "inert diluent" designates an element, compound, mixture of two or more elements or compounds which exert substantially no chemical or physical effect upon either the catalyst or the lead associated therewith.

It is understood that the instant method of catalyst regeneration is applicable to a great many catalysts, and even to the removal of lead from non-catalytic contact masses, and the invention is not therefore to be limited to regeneration of any one catalyst or class of catalysts. In general, a suitable waste product conversion catalyst will comprise one or more catalytically active metallic components which are preferably composited with a refractory inorganic oxide carrier material. The catalyst is preferably utilized, in the conversion of waste products, in the form of a fixed, particle-form bed, the particles having any desired shape such as spheres, cylinders, pellets, granules, etc. By way of example only, and not by way of limitation, typical catalytically active metallic components include vanadium, chromium, molybdenum, tungsten, members of the iron group and platinum group of the periodic table, copper, silver and gold. A particular metal may be used singly or in combination with any of the foregoing metals. Thus, a typical waste product conversion catalyst may comprise one or more metals selected from groups IB, VA, VIA and VIII of the periodic table. Particularly good catalysts, from the standpoint of high activity for hydrocarbon and carbon monoxide conversion, contain the following catalytically active metals or combinations thereof: platinum, palladium, other noble metals such as iridium and rhodium, iron, cobalt, nickel, chromium, copper, vanadium, tungsten, molybdenum, manganese, silver, gold, and various mixtures including copper-cobalt, copper-iron, copper-chromium, nickel-chromium, cobalt-chromium, manganese-chromium, manganese-iron, platinum-iron, platinum-cobalt, platinum-nickel, palladium-copper, palladium-iron, palladium-cobalt, palladium-nickel, palladium-platinum, palladiumcopper-cobalt, platinum-copper-cobalt, copper-cobalt-nickel-palladium, platinum-palladium-cobalt, etc.

The catalytically active metallic component or components are usually composited with a refractory inorganic oxide, the latter serving as a carrier or base therefor, which compositing may be accomplished, for example, by separate, simultaneous, or successive precipitation methods, or by impregnating the carrier with a soluble salt of the catalytically active metal or metals. Although superior catalysts usually result when the refractory inorganic oxide contains at least a portion of alumina, other suitable refractory inorganic oxides may be employed in lieu of or in conjunction with the alumina, such as silica, boria, titania, zirconia, hafnia, and mixtures of two or more of these. The carrier material may be synthetically prepared by any suitable method including separate, successive, or coprecipitation methods of manufacture, or may comprise naturally occurring substances such as clays or earths which may or may not be activated prior to use by one or more treatments including drying, calcining, steaming, or particular treatments with inorganic and organic reagents. Many methods of preparing such catalytic composites exist and are well known in the prior art; these need not be described in detail herein since no claim is being made to any method of manufacturing such catalysts or to their use in converting waste products.

The background of the present invention having been set forth, the instant regeneration technique, including several modifications thereof, will now be described in more detail. When the conversion catalyst has accumulated sufficient lead as to become substantially deactivated, such amount being from about 5% to about 50% by weight of lead based on the leaded catalyst, and, more commonly, from 10% to 25% by weight, the catalyst may either be removed from the convertor and regenerated in special facilities therefor, or regenerated in situ. In one embodiment, regeneration is accomplished by passing a stream of regenerating gas consisting of an anhydrous mixture of hydrogen chloride and chlorine into contact with the catalyst. The regenerating gas converts the non-volatile lead compounds associated with the catalytic mass into volatile lead tetrachloride and additionally operates to strip out the lead tetrachloride from the catalytic mass. Since lead tetrachloride freezes at 5° F. and decomposes into lead dichloride and chlorine at a temperature above about 221° F., the temperature of regeneration should be maintained within the range of about 5° F. to about 220° F., and preferably from about 30° F. to about 210° F. Temperatures below 5° F. may be employed if desired, in which case the volatilization of the lead tetrachloride occurs by way of sublimation rather than evaporation; however, the rate of lead removal at such low temperature would obviously be much slower. Also, because lead tetrachloride decomposes upon contact with water, it is necessary that the regenerating gas be substantially water-free. The pressure of regeneration is not critical and may range from subatmospheric to 1000 p.s.i. or more; however, good results are obtained, as well as economy of operation, when the regeneration is conducted at about atmospheric pressure.

It is also within the scope of this invention to effect the regeneration batch-wise; that is, the spent catalyst may be contacted with a fixed, excess volume of regenerating gas, as in a rotating autoclave, and thereafter subjected to the action of a stripping gas or to moderate heating to drive off lead tetrachloride vapors. In connection with batch-type regeneration, a further possible variant is to adjust the temperature and pressure of the regenerating medium such that it is maintained in the liquid, rather than the gaseous phase, during contacting thereof with the catalyst, then decanting or flashing off the unreacted liquid and stripping out the lead tetrachloride from the treated catalyst.

The relative proportion of hydrogen chloride to chlorine in the regenerating medium will depend upon the nature of the lead compounds associated with the lead-contaminated catalyst; in general, the mol ratio of HCl to $Cl_2$ should range from about 0.1 to about 10 gram-molecules of HCl per gram-molecule of $Cl_2$. Assuming that all of the lead associated with the catalyst exists as a divalent compound containing no chloride, the required mol ratio of HCl to $Cl_2$ would theoretically be 2:1; however, inasmuch as the lead may exist in other valence states, or have one or more chloride ions already connected therewith, more or less hydrogen chloride may be required for optimum utilization of the regenerating medium, as a specific application may warrant.

As a general rule, the activity of nearly all catalysts is restored when the lead content thereof is reduced to below about 4% by weight of the total composite. The time required to effect the regeneration depends, of course, upon a number of variables such as the initial concentration of lead in the catalyst, the size and disposition of the catalyst particles, the temperature of the regeneration, and the space velocity of the regenerating gas. The preferred space velocity is within the range of 5 to 10,000 volumes of regenerating gas per volume of catalyst per hour, and more desirably within the range of 100 to 2000 volumes of regenerating gas per volume of catalyst per hour.

When the regenerating gas is composed entirely of reactable materials, i.e., HCl and $Cl_2$, and the regeneration is effected stream-wise, a substantial portion of such gas may often emerge unreacted from the regeneration zone, and the gas should therefore be recycled to the regeneration zone if undue waste thereof is to be avoided. A once-through operation is, however, more attractive economically, and this is accomplished in a preferred embodiment of the present invention which provides a regenerating gas comprising a mixture of HCl, $Cl_2$ and an inert diluent, the latter being a gaseous element or compound which is substantially unreactive toward the lead, catalyst, and lead tetrachloride. Suitable inert diluents include, but are not limited to, nitrogen, carbon dioxide, helium, neon, argon, krypton and xenon. The inert diluent is preferably present in major proportion, the reactable materials comprising from 1 mol percent to about 50 mol percent of the mixture. By properly adjusting conditions, substantially all of the reactable materials can be consumed in a single pass through the catalyst mass, the inert diluent serving to strip the lead tetrachloride free of the catalyst mass. Much higher space velocities based on the total volume of regenerating gas, e.g., 1000 to 50,000 volumes of regenerating gas per volume of lead-contaminated catalyst per hour, may be employed when the regenerating gas contains an inert diluent, and the time required to accomplish the desired degree of lead removal is thereby correspondingly shortened.

The following example is given for the purpose of further illustrating the method of the present invention and to indicate the benefits afforded through the utilization thereof. It is not intended that the present invention be limited to the reagents, concentrations and/or conditions employed within the example.

A catalyst comprising 0.4% platinum on alumina, designated catalyst A in Table I below, is contaminated with lead by prolonged exposure to exhaust gases emanating from an internal combustion engine using leaded fuel. It is then contacted with a gaseous stream consisting of nitrogen, hydrogen chloride and chlorine at 80°–100° F. under conditions shown in Table I. The activity of the untreated and treated catalyst, as well as that of fresh catalyst, is tested by measuring the ignition temperature and temperature rise obtained by passage of air containing benzene vapor, under standardized conditions, in an apparatus in which a bed of the catalyst is gradually heated until ignition of the benzene vapors occurs (as indicated by a temperature differential between the bed inlet and bed outlet). A small temperature rise and/or a high ignition temperature indicate a low conversion activity. The conditions of treatment of the deactivated catalyst and a comparison of the activities of fresh catalyst and regenerated catalyst are shown in Table I.

Table I

| Catalyst | Weight Percent Lead | Activity Before Lead Stripping | | Lead Stripping Treatment | | | $Cl_2$, cc./min. per 100 cc. Catalyst | Weight Percent Lead After Stripping | Activity After Lead Stripping | |
|---|---|---|---|---|---|---|---|---|---|---|
| | | Ignition Temp., °F. | Temp. Rise, °F. | Time at 80°–100° F., Hours | Nitrogen cc./min. per 100 cc. Catalyst | HCl, cc./min. per 100 cc. Catalyst | | | Ignition Temp., °F. | Temp. Rise, °F. |
| Fresh | 0 | 325 | 450 | | | | | | | |
| A | 21 | 415 | 55 | 1.0 | 2,800 | 330 | 470 | 0.82 | 335 | 410 |

As shown by Table I, the lead stripping treatment reduces the lead content of the spent catalyst from 21% to 0.82% by weight, the ignition temperature is lowered almost to that of the fresh catalyst, and the activity is increased several-fold, approaching that of the fresh catalyst. The present invention thus constitutes a simple, single-step regeneration treatment which is both rapid and quantitative with respect to lead removal, and may be advantageously employed in the regeneration of a wide variety of catalysts and catalytic composites which have become contaminated with lead.

I claim as my invention:

1. A method of regenerating a solid catalyst containing from about 5% to about 50% by weight of lead and at least one metallic component selected from the group consisting of the metals in groups IB, VA, VIA and VIII of the periodic table and manganese, which comprises contacting said catalyst at a temperature below 221° F. with an anhydrous mixture comprising hydrogen chloride and free chlorine in a mol ratio of hydrogen chloride to chlorine within the range of about 0.1 to about 10, and continuing said contacting until the lead content of the catalyst is reduced to below about 4% by weight.

2. The method of claim 1 further characterized in that said temperature is within the range of about 5° F. to about 220° F.

3. The method of claim 1 further characterized in that said temperature is within the range of about 30° F. to about 210° F.

4. The method of claim 1 further characterized in that said anhydrous mixture contains an inert gaseous diluent.

5. The method of claim 4 further characterized in that said diluent comprises nitrogen.

6. The method of claim 4 further characterized in that said diluent comprises above about 50 mol percent of said mixture.

7. A method of regenerating a platinum-alumina catalyst containing from about 5% to about 50% by weight of lead, which comprises contacting said catalyst at a temperature below 221° F. with an anhydrous mixture comprising hydrogen chloride and free chlorine in a mol ratio of hydrogen chloride to chlorine within the range of about 0.1 to about 10, and continuing said contacting until the lead content of the catalyst is reduced to below about 4% by weight.

References Cited in the file of this patent

UNITED STATES PATENTS

| 2,488,744 | Snyder | Nov. 22, 1949 |
| 2,867,497 | Houdry et al. | Jan. 6, 1959 |

OTHER REFERENCES

Mellor: "Comprehensive Treatise on Inorganic and Theoretical Chemistry," vol. 7, Longmans Green and Co., New York, N.Y., 1927, p. 719.